Feb. 1, 1938. W. E. HARRINGTON Re. 20,648
WELL SCREEN
Original Filed April 18, 1933
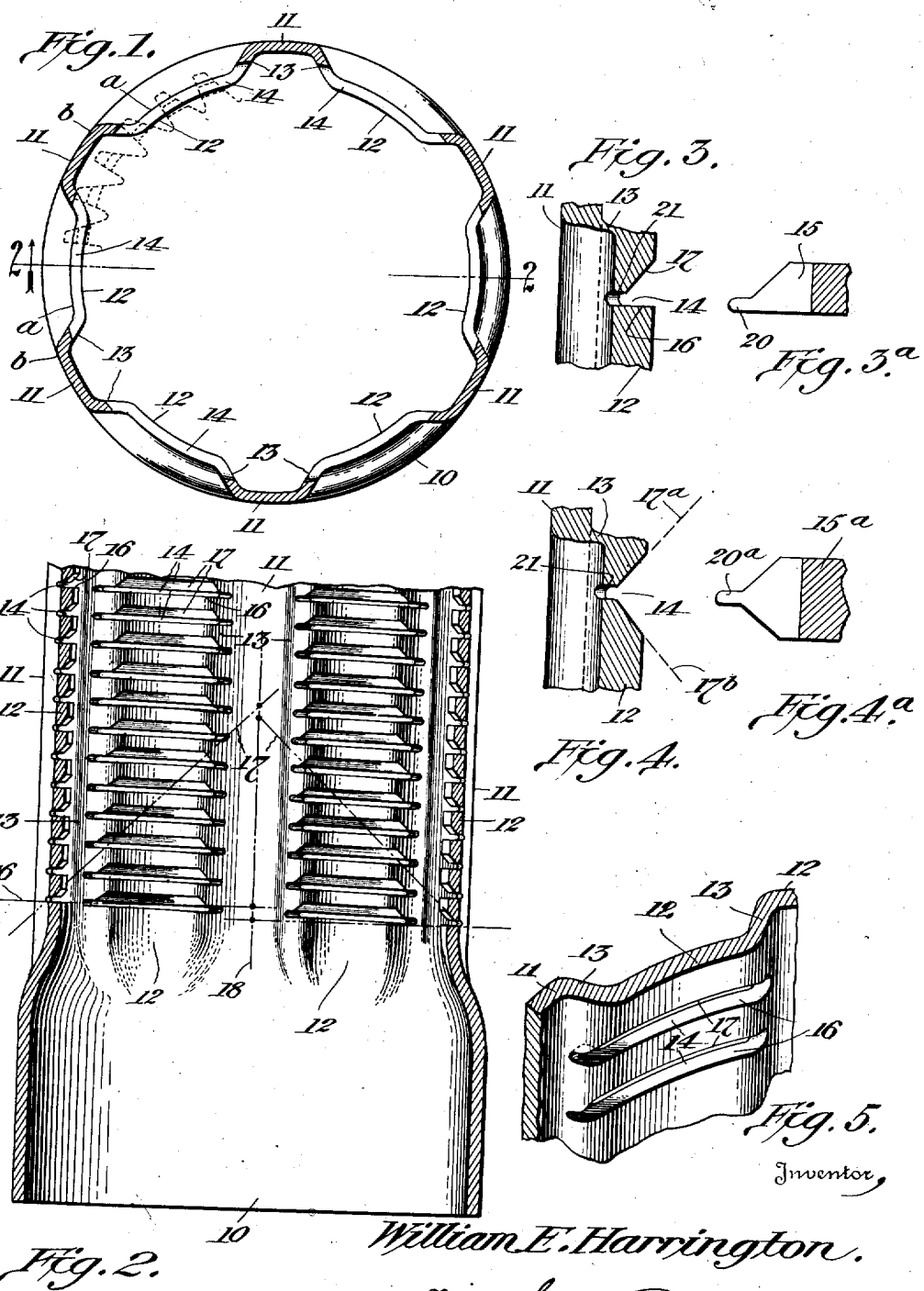
Inventor,
William E. Harrington.
By Strauch, Nauman & Co.
Attorneys Reissued Feb. 1, 1938 Re. 20,648

UNITED STATES PATENT OFFICE 20,648

WELL SCREEN

William Edward Harrington, Beaumont, Tex.

Original No. 1,994,344, dated March 12, 1935, Serial No. 666,749, April 18, 1933. Application for reissue October 21, 1936, Serial No. 106,929

12 Claims. (Cl. 166—5)

This invention relates to improvements in well screens, and is particularly adapted for employment in oil wells.

One of the features of the present invention is the provision of a screen which may be easily and cheaply manufactured by a direct and simple procedure.

Another feature of the present invention is the arrangement and construction of a screen in such manner that the entering liquid has imparted to it a swirling or whirl-pool movement which facilitates the operation of the screen and the ascent of the liquid within the well pipe.

With these and other objects in view as will appear in the course of the following specification and claims, an illustrative form of practicing the invention is set forth on the accompanying drawing, in which:

Figure 1 is a substantially horizontal cross-section of a screen according to this invention, the section being taken along the pitch line of the apertures.

Figure 2 is a diametrical upright section of the same, substantially on line 2—2 of Figure 1.

Figure 3 is a sectional view, on a greatly enlarged scale, of a portion of the wall shown in Figure 2.

Figure 3*a* is a fragmentary detail view of a portion of the cutting tool which is preferably employed in forming the well screen.

Figures 4 and 4*a* are corresponding views, on a smaller scale, showing a fragment of a well screen wall having a modified form of aperture therein, and a fragmentary detail view of a cutter for forming the same.

Figure 5 is a perspective view showing a small portion of the well screen as viewed from the inside.

According to the present invention, a well screen may be formed from a single piece of originally tubular material by deforming it locally to provide inwardly extending ribs which are disposed longitudinally of the screen and it will be understood that this does not limit the invention to a structure in which these ribs are wholly and fully parallel to the axis. Preferably the inward ribs are of greater annular extent than the remaining intermediate portions of the tubular body. The inward ribs are joined by wall sections which merge into the remaining portions of the tubular body. These remaining portions are offset with respect to said inward ribs and are illustrated as having substantially the same radii as the original tubular body although this is not essential. The screen blank thus formed is then treated by a threading operation with a threading tool having an external diameter which is less than the internal diameter of the tubular body portion, and greater than the external diameter of the inward ribs (Fig. 1) whereby an internal thread, so to speak, is cut in the casing blank. The operating tool 15 is illustrated in dotted lines in Figure 1, clearly showing the operation above described.

The well screen thus produced therefore comprises a portion 10 at at least one end of the screen which is illustrated as being a cylindrical tube, although obviously it may have any other desired form for sealing with respect to a section of well pipe or bottom plug in the manners well known to experts in this art. Above this cylindrical portion, the illustrated form shows the employment of (here six) inward ribs 12 joined by intermediate portions 11 of the tubular body in like number. The external surface *a* of an inward rib (Fig. 1) is offset inwardly with respect to the external surface *b* of the adjacent offset portion by a distance not less than the annular thickness of the material of the body. Connecting the alternating inward ribs and the remaining portions of the tubular body are wall sections 13 which extend at an angle to the peripheries of the inward ribs and the portions 11 of the tubular body. It will be seen that such a structure may be formed by deforming an originally cylindrical body blank by depressing the inward ribs toward the axis.

A tapping operation is now performed upon the blank so constituted to provide pluralities of apertures 14 in each of the inward ribs. In the tapping operation, the annular wall portions are cut through, but the remaining portions of the tubular body are unaffected by the tapping tool. This is apparent from an inspection of Figure 1, wherein the position of the tapping tool is illustrated in broken lines. Furthermore, it will be apparent that when the well screen is constructed as described above with the inwardly deformed portions, the tapping tool may be readily passed through the cylindrical portions at the end of the well screen and brought into cutting engagement with said inwardly deformed portions.

It is preferred to cut these apertures by a tapping tool having a tooth cross-section as shown by the fragment 15 thereof in Fig. 3*a*, so that on any upright longitudinal plane through an inward rib, the bottom wall of the rib is formed by a horizontal line 16 intersecting the axis (Figs. 2 and 3), while the upper wall includes a portion defined by a line 17 which intersects the common axis 18 (Fig. 2) at a point above the intersection of line 16 therewith. The surfaces of the lower walls of the ap-tures in such a well screen therefore constitute a helical surface, while such portions of the upper walls constitute a helico-conical surface. In Fig. 2, for example, it will be noted that the successive radial lines 16 of the bottom surfaces of the apertures lie in such a helical surface and thus successively intersect the common axis at different points thereof: while the lines 17 similarly intersect the common axis at different points, these points being spaced at like distances from the intersection of the corresponding lines 16 with the common axis 18.

Preferably the lines 17 do not intersect the outer wall of the inward rib at the external edge of the upper wall of the aperture, but an extension or nose 20 is provided on the tool for forming the lower surface of the slot along line 16, while the upper surface 21 of the slot is formed parallel thereto and at a distance therefrom which is selected for excluding particles of a desired size.

The successive apertures therefore are helically arranged. It is to be noted (Fig. 2) that the bottom wall of each slot lies in a plane which is inclined with respect to the axis of the tubular body but that this plane includes a radial line which intersects the said axis at right angles.

In the modified form of Fig. 4, both upper and lower walls of the apertures have such helico-conical walls lying along the lines **17*a*, 17*b* which intersect the common axis both above and below a horizontal plane through the particular aperture. Such slots may be formed by a tool 15*a*** (Fig. 4*a*) having a nose **20*a* for the same purpose as the nose 20 of tool 15**.

It will be noted from the above description that a well screen has been devised wherein the body portion is of uniform diameter throughout the entire length and the body portion is deformed inwardly to provide the ribs which contain the slots. This results in a body portion which is very strong and which is of maximum capacity for a given size casing. Furthermore, the ribs are offset inwardly so that when the screen is inserted through the casing there is no contact of the slots with the casing which is likely to injure the screen. It will also be noted that the side walls of the slots are substantially parallel from the outer surface of the screen inwardly for a short distance. This avoids any knife edges which are likely to wear away through the passing of the grains of sand into and through the slots. Furthermore, the side walls diverge inwardly and any sand passing into the slot will be quickly released so that it will flow away from the slot and prevent the clotting of the sand. The end walls of the slots are also inwardly diverging so that any particles of sand are quickly released just as soon as this sand passes well into the slot.

In use, a well screen of the present nature is secured at the lower end of the pipe, and is itself closed at its lower end by a plug in the usual way. It is lowered into a well below the surface of the liquid therein, and in the case of an oil well, the gas pressure is thus employable for forcing the liquid and gas through the screen into the interior thereof. The entering fluid is directed relatively upwardly by the particular preferred shape of slot or aperture shown in Fig. 3, so that an ascending moment of force is directed against the column of liquid within the screen and the associated pipe, tending in a kinetic way to assist the static gas pressure in raising the liquid. Further, the helical shape of the slots causes the jets of fluid entering through the individual apertures to be directed with a chordal or tangential component rather than with a purely radial one as in prior screens. Thus a swirling or whirlpool motion is set up within the screen for further assisting in the raising of the liquid by its kinetic energy, as this energy of the jets is no longer counteracted by the opposition of jets entering at diametrically opposite points. Further, this leads to a rapid upward movement of the fluid within the screen, and thus to a more rapid movement of the liquid into the casing under the pressure of the gas, for example. A continuous flow of the liquid occurs and thus with an oil well, for example, the gas is more advantageously employed and the longevity of the well as a flowing well increased, so that a greater percentage of recovery from a given well is possible. That is, the gas-oil ratio is increased, as the quantity of gas and/or its pressure for raising the oil is less.

It is obvious that the invention is not limited solely to the form of construction shown, but that it may be modified in many ways within the scope of the appended claims.

Having thus described the invention, what I claim as new and desire to secure by Letters Patent, is:

1. A well screen comprising an integral tubular body having inward longitudinally disposed ribs joined to the remaining portions of the tubular body, the external surfaces of said ribs being offset inwardly from the external surfaces of the remaining portions of the tubular body by a distance not less than the annular thickness of the body, said ribs having therein helically extending slots whose lower walls lie along helical surfaces and whose upper walls lie along helico-conical surfaces so that the entering fluid tends to cause an upward and rotational movement of the column of fluid within the screen with respect to the axis thereof.

2. A well screen comprising an integral hollow body portion having inwardly extending longitudinal ribs joined by its wall sections to the body portion, the external surfaces of said ribs being offset inwardly from the external surface of said body portion by a distance not less than the annular thickness of said body portion, said ribs having helically disposed slots with upwardly and inwardly inclined upper walls extending through a portion of each of said wall sections whereby to assist the ascent of the liquid passing therethrough.

3. A well screen comprising an integral tubular body portion of substantially uniform thickness having spaced inwardly extending longitudinal ribs, said ribs having therein slots the bottom walls of each of which lies in a plane which is inclined with respect to the axis of said body portion but which plane includes a radial line extending at substantially right angles to the axis of said body portion.

4. A well screen comprising an integral tubular body portion of substantially uniform thickness having spaced inwardly extending longitudinal ribs, said ribs having helically arranged slots therein, the bottom wall of each of said slots lying in a plane which is inclined with respect to the axis of said body portion but which plane includes a radial line extending at substantially right angles to the axis of said body portion, and a portion of the upper wall of each of said slots being inclined upwardly whereby to permit the entering fluid to move upwardly and inwardly to cause a rotational movement of the column of fluid upwardly.

5. A well screen comprising an integral tubular body portion having spaced inwardly extending longitudinal ribs, said ribs having slots the bottom wall of each of which lies in a plane inclined with respect to the axis of said body portion, said plane intersecting a plane extending longitudinally of the body portion through the axis thereof at right angles.

6. A well screen comprising an integral tubular body having inwardly extending longitudinal ribs, said ribs being provided with helically disposed slots extending therethrough and shaped so that the upper wall of each slot lies in a plane inclining upwardly and inwardly and intersecting the axis of said tubular body at an acute angle whereby to assist in the ascent of the fluid, the remaining portions of the tubular body between said ribs being imperforate and serving to strengthen the screen.

7. A well screen comprising an integral tubular body having inwardly extending longitudinal ribs, said ribs being wider than the intermediate portions of the tubular body and having helically disposed slots extending therethrough and shaped so that the lower wall of each slot contains a radial line intersecting the axis of the tubular body at right angles and so that the upper wall of each slot lies in a plane inclining upwardly and inwardly and intersecting the axis of the tubular body at an acute angle whereby to assist in the ascent of the fluid.

8. A well screen comprising an integral tubular body of substantially uniform thickness having a cylindrical end portion and inwardly directed longitudinal ribs extending therefrom, said ribs having helically disposed slots, the lower wall of each slot containing a radial line cutting the axis of the screen at right angles and the inner portion of the upper wall of each slot lying in a plane intersecting the axis of the body at an acute angle, the outer portion of the upper wall of each slot being substantially parallel to said lower wall.

9. A well screen comprising an integral tubular body portion of substantially uniform thickness and uniform diameter throughout, said body portion being deformed inwardly at spaced intervals circumferentially of the body to form inset ribs which extend from points adjacent one end of said body to points adjacent the other end thereof, said ribs having therein slots at spaced intervals which extend across the rib from one side thereof to the other, the side walls of said slots at the outer side of said body being parallel for a short distance inwardly and thence diverging and the end walls of said slots being inwardly diverging so that particles of solid material passing from the outside of the screen into the slots will be quickly released.

10. A well screen comprising an integral cylindrical body portion of substantially uniform thickness and uniform diameter throughout, said body portion being deformed inwardly at spaced intervals circumferentially of the body to form inset ribs which extend from points adjacent one end of the body to points adjacent the other end thereof, the inner and outer faces of said ribs being curved about the center line of the cylindrical body portion, and said ribs having slots extending from one side thereof to the other.

11. A well screen comprising an integral cylindrical body portion of substantially uniform thickness and uniform diameter throughout, said body portion being deformed inwardly at spaced intervals circumferentially of the body to form inset ribs which extend from points adjacent one end of the body to points adjacent the other end thereof, the inner and outer faces of said ribs being curved about the center line of the cylindrical body portion, and having helically extending slots crossing the ribs from one side thereof to the other.

12. A well screen comprising an integral cylindrical body portion of substantially uniform thickness and uniform diameter throughout, said body portion being deformed inwardly at spaced intervals circumferentially of the body to form inset ribs which extend from points adjacent one end of the body to points adjacent the other end thereof, the inner and outer faces of said ribs being curved about the center line of the cylindrical body portion and having helically extending slots crossing the ribs from one side thereof to the other, the side walls of said slots at the outer side of said body being parallel for a short distance inwardly and thence diverging so that particles of solid material passing from the outside of the screen into the slot will be quickly released.

WILLIAM EDWARD HARRINGTON.